H. W. ADAMS.
USE OF STEAM TO MAKE ZINC WHITE.
No. 8,477. Patented Oct. 28, 1851.
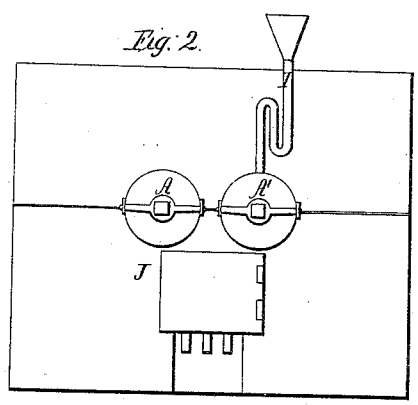
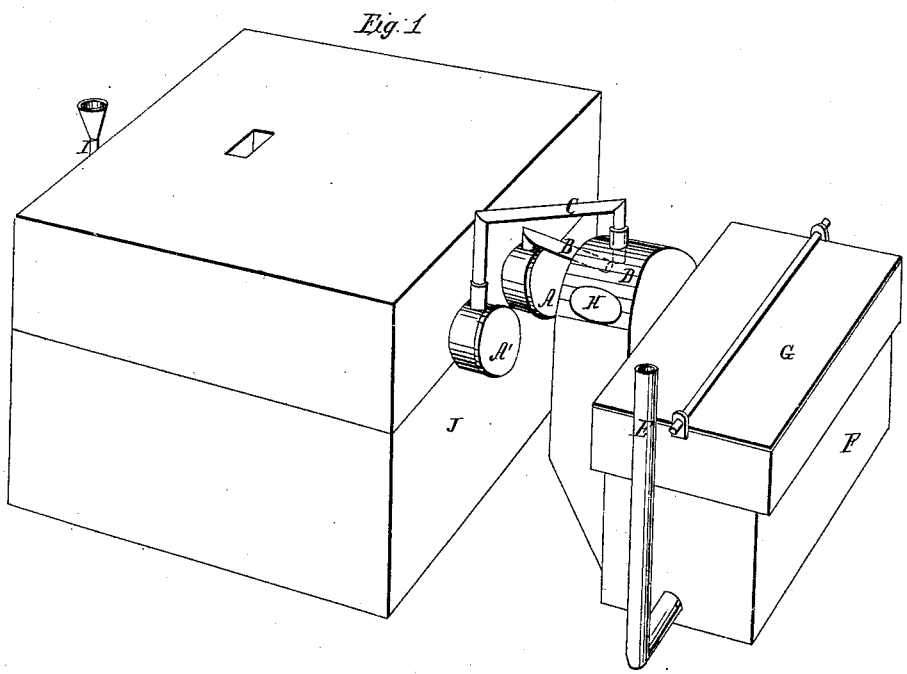

UNITED STATES PATENT OFFICE.

HENRY W. ADAMS, OF BOSTON MASSACHUSETTS.

IMPROVEMENT IN THE USE OF STEAM TO MAKE ZINC-WHITE.

Specification forming part of Letters Patent No. 8,477, dated October 28, 1851.

*To all whom it may concern:*

Be it known that I, HENRY W. ADAMS, of Boston, in the county of Suffolk and State of Massachusetts, of the United States of America, send greeting: Whereas Queen Victoria, by her Letters Patent under the great seal of Great Britain, bearing date at Westminster, the 29th day of May, A. D. 1851, did give and grant unto me, my executors, administrators, and assigns her special license, full power, sole privilege, and authority that I, the said HENRY W. ADAMS, my executors, administrators, and assigns should at any time agree with, and no others, from time to time and at all times thereafter during the term of years therein mentioned, should and lawfully might make, use, exercise, and vend within that part of the United Kingdom of Great Britain and Ireland termed England, Wales, the town of Berwick-upon-Tweed, the islands of Guernsey, Jersey, Alderney, Sark, and Man, and in all the colonies and plantations abroad belonging to the said kingdom, my invention of an improved means of generating galvanic electricity, of decomposing water or various electrolytes, of collecting hydrogen, of burning it or atmospheric air separately or in combination, in which said Letters Patent there is contained a proviso that I, the said HENRY W. ADAMS, shall particularly describe and ascertain the nature of my said invention, and in what manner the same is to be performed, by an instrument in writing under my hand and seal, to be enrolled in the High Court of Chancery within six calendar months next and immediately after the date of the said in-part-recited Letters Patent, as reference being thereunto had will more and at large appear; now, know ye that, in compliance with said proviso, I, the said HENRY W. ADAMS, do hereby declare that the nature of my invention and the manner in which the same is to be performed are particularly described and ascertained in and by the following specification and accompanying drawings, letters, figures, and references thereof.

Of the said drawings, Figure 1 denotes a vertical and central section of my apparatus. Fig. 2 is a top view of the battery as detached. Fig. 3 is a vertical and central section of it.

The principal part of my invention consists in constructing a battery so as to generate as nearly as possible from a given weight of metal the greatest possible quantity of electricity and give to it the greatest degree of intensity. To obtain the greatest possible quantity of electricity the battery should be constructed so that any given weight of electro-negative metal proposed to be used in a single cell shall present the greatest possible amount of magnetic surface or surfaces within the smallest amount of space opposite to the electro-positive metal. To obtain the greatest degree of intensity the battery should be so constructed that the surface or combined aggregate of surfaces of the electro-negative metal shall be presented opposite to the electro-positive metal in an insulated coil or coils of the smallest diameter which will conduct the quantity of the electric current proposed to be generated without melting the coils.

The usual mode of constructing my battery is to take from thirty to fifty fine copper wires, or other electro-negative metal, about one-sixtieth part of an inch in diameter and about two hundred and twenty-five feet long, and lay them lengthwise, side by side, and insulate them in one package or bundle, making an electro-negative surface of from nearly thirty to fifty square feet. I then take a cylinder, *a*, (see Figs. 1, 2, 3,) of zinc about eight inches long and four and a half inches in diameter from outside to outside, and three and a half inches in diameter from inside to inside, making a surface of about one and one-third square foot. I then wind the electro-negative metal both within and around the zinc cylinder in double coils and attach one end of the coil metallically to the zinc. I wind these coils so as to leave a space of about one-quarter of an inch between the coils and the zinc, such space to be occupied by the water to be decomposed. The said electro-positive metal may be either a hollow or solid cylinder, or a prism or tube, of zinc, either pure or amalgamated, or any other oxidizable or thermo-electric metal; and said electro-positive metal may be a wire or wires, as aforesaid, or a thin metallic sheet or a leaf rolled in the form of a wire, or any other form of metal by which the greatest amount of surface can be gained in the smallest space, opposite to the electro-positive metal. The said metals thus arranged constitute a single cell, with a great increase of surface or aggregate of surfaces of the electro-negative metal over the electro-positive metal, instead of the metals being arranged in plates, bars, or cylinders, as in batteries heretofore constructed, with the metal in single cells or partitions against each other, with equal or nearly equal surfaces of each metal in each cell.

The principle or difference between my construction of battery and that heretofore employed may thus be described: In any of the old forms of battery it has been a general law to expose in any one cell of the same, and facing to one another, the same or very nearly the same amount of exciting-surface, respectively, of the two metals used—that is to say, if one square foot or any other quantity of surface of the positive metal was exposed in such cell to the action of the liquid therein, the same or very nearly the same amount of surface of the negative metal was employed therein, and to operate in connection with such positive surface. My discovery or invention rests on a new law or rule, which is that while I employ in what may practically be termed "any one cell" any given amount of surface of the positive metal, I also employ in the same cell not the same or about the same amount of surface of negative metal, but a much greater amount of it, which, in order to operate to the best advantage, should be distributed in sections or parts (connected together) equal or about equal in dimensions to those of the positive surface. I insulate in any proper manner the pack of electro-negative surfaces, wire or wires, or other forms of metal, as above named, in order to protect their surfaces from contact with the liquid of the cell or from any metallic deposit which might coat them and interfere with their action; and when wires are used I wind the pack in coils thus insulated, in order to compel the electric current generated and conducted by the electro-negative metal to flow in said coils, by which the electrical power of the battery is greatly increased, and the electricity generated by the battery is concentrated in a circuit of coils, instead of being diffused over the whole surface of the electro-negative metal, as in batteries heretofore constructed; and each of these coils is rendered magnetic in consequence of the lateral effect of the electrical current, one side of each coil being rendered by the current positive, the other side negative, and capable of exerting the magnetic energy thus created through the insulation; or I will use said coils uninsulated, and I will also use the electro-positive metal in a battery in insulated or uninsulated coils, instead of the form of a cylinder, as before named.

In using the battery for manufacturing hydrogen gas from water, or in decomposing any other liquid or electrolyte, I place the battery in the water or electrolyte. The water or electrolyte thus forms a thin sheet or layer between the coils and zinc, in the small space $d$, left between them in constructing the battery as aforesaid, and in the small spaces between the coils, so that the electricity is not obstructed in its course by a large body of water, but its whole energy is exerted on a thin sheet of the liquid; or the battery may be used out of the liquid or electrolyte, and the electrical current be conveyed by metallic conductors to the electrodes, as in other batteries. In decomposing water or other electrolyte, the water or electrolyte may be either pure or mixed with other liquids or substances, or be cold or hot; but heat increases the rapidity of decomposition. In manufacturing hydrogen gas from water, the electrical current generated by the battery influences the chemical affinity of the oxygen in the water for the zinc or other oxidizable metal in the battery. The oxygen in the water, being electro-negative, tends to combine with the zinc, which is electro-positive, and by charging the zinc, or its equivalent metal, with an electro-positive current, the force of both powers is exerted simultaneously, causing the oxygen to combine with the zinc, thereby liberating the hydrogen and forming an oxide or zinc, which should be held in solution by having the water slightly acidulated—say one part of sulphuric acid to twenty of water. The hydrogen thus liberated rises to the surface, and may be collected in a gasometer inverted in the usual mode over the water, and from thence be conveyed by proper pressure in a tube to burners, to be ignited, or for other uses. If the water becomes too much saturated with the oxide held in solution, it should be drawn off and a fresh supply added as often as may be necessary. A more perfect arrangement for collecting the gas and affording a constant supply of fresh acidulated water or other liquid, also for removing and preserving for future use the solution with which the water in the battery has become saturated, is as follows: In Fig. 6 the battery A is placed upon a stand, B, erected upon the bottom of a cistern, C, which cistern is to be filled or nearly filled with acidulated water, and is made to contain an inverted vessel, D, which surrounds and incloses the battery A. The pipe E passes up into the vessel C, and terminates at the height at which it may be desirable for the liquid to stand therein. The said pipe has a funnel, F, upon its upper end, and receives a supply of acidulated water from a supply cistern or reservoir, G. There is another reservoir, H, placed by the side of the tank or reservoir C, the upper edge of this reservoir H being placed at or about at the level of the upper surface of the liquid in the generating-cistern C. A pipe, I, is carried out of the bottom of the generating-cistern C and upward and over into the reservoir H, such reservoir H being for the purpose of receiving the deposits of the sulphate of the oxide of zinc. The oxidized water settles into the bottom of the generator C, and a drop of fresh acidulated water dropped into the funnel F will deliver a drop of the oxidized water from the pipe I into the reservoir H. Thus the action of the battery remains constant, and the oxide is removed from its sphere as fast as it is fully formed. R is the gasometer, placed in a water cistern or tank, N, and connected with the generator or inverted vessel D by a pipe, L. It also has a gas-pipe, $a^2$, for conducting the gas from it. I therefore claim as of my invention the arrangement of the parts of the apparatus, substantially as represented in Fig. 6.

What I claim as the first part of my invention, and desire to secure by Letters Patent, is severally set forth as follows:

I do not claim as my invention the construction of a battery of several concentric cylinders, nor to make it, as heretofore made, "to consist of one surface of the electro-negative metal arranged opposite to an equal or nearly equal surface of the electro-positive metal;" but what I consider as my improvement and the change made by me, and which is productive of very great consequences when quantity of electricity is considered, consists in constructing the battery with, in any one cell thereof, the electro-negative metal arranged in a bundle of double or more thicknesses, folds, threads, or filaments presenting a considerable or great increase of surface, or aggregate of surfaces, opposite the electro-positive metal, instead of nearly equal surfaces of one metal against the other, as batteries have heretofore been constructed, the greatest capacity of the battery for generating electricity being attained when any given weight of the electro-negative metal proposed to be used presents the greatest surface, or aggregate of surfaces, within the smallest space opposite the electro-positive metal.

I also claim as my invention the insulation of either of the metals used in a battery, for the purpose, essentially, as specified.

I also claim as my invention the mode of constructing a galvanic battery, so as to give the quantity of electricity generated in a single cell an increased degree of intensity by presenting the surface, or aggregate surfaces, of the electro-negative metal opposite the electro-positive in an insulated coil or coils, which coils, in order to give the greatest degree of intensity, should be of the smallest diameter which will conduct the quantity of the electric current proposed to be generated without its melting the coils.

I also claim as my invention the right of arranging and using, in a galvanic battery, the electro-negative metal in the shape of a wire or a bundle of wires, or a thin sheet or leaf of metal rolled up as a wire, or thin sheets or plates of metal in single or double or more coils or packages, within or around, or both within and around, the electro-positive metal, or in any other equivalent position, so as to present opposite to the electro-positive metal in the smallest amount of space the greatest possible amount of surface, or aggregate of surfaces, for conducting electricity, thereby generating the greatest quantity of electricity that can be obtained by any given weight of electro-negative metal in a battery.

I also claim as my invention the insulation of said wire or bundle of wires, or thin metallic sheets, filaments, or packages of metal in a battery, when wound in a coil or coils, or disposed in any other equivalent manner, in order to generate and conduct the electrical current in a circuit of coils, or other equivalent manner, so as to give to the quantity of galvanic electricity generated in a single or separate cell the greatest degree of intensity, and also to give a magnetic power to the coils by virtue of the lateral force of the galvanic current flowing on an insulated surface.

I also claim as my invention or improvement the making the electro-negative metal of a galvanic battery in the form of a coil, while the electro-positive metal is in that or any other proper form; and I further claim as my invention or improvement the making the electro-positive metal of a galvanic battery in the form of a coil, while the electro negative metal is put in that or any other proper form.

I do not claim as my invention or improvement to decompose water by means of an galvanic battery and conducting-wires leading from its opposite poles in the manner heretofore practiced; but what I do claim as my improvement is the direct immersion of the battery in the water to be decomposed, and dispensing with the said conductors, as specified, said liquid being either hot or cold, thus completing the circuit and increasing its effect on the liquid or electrolyte by immediate contact with it.

I also claim the winding the coils or making such other equivalent disposition of the metal as to so leave a thin sheet of water merely between the zinc or other oxidizable or thermo-electric metal and the electro-negative metal, that the electrical current may exert on the thin sheet of water its whole energy in decomposing it without being obstructed by too great a body of water.

I also claim as my invention the improvement of employing the electrical current generated by the galvanic battery to influence the chemical affinity of the oxygen in the water for the zinc or other oxidizable metal, causing the oxygen to combine more rapidly with the zinc, or its equivalent aforesaid, by the simultaneous exercise of both these powers, and thereby liberating the hydrogen with greater rapidity.

I also claim my battery for the production of motive power.

I am aware that modes have been devised to remove the oxide from batteries which are designed to generate electricity to be conducted by means of wires to the electrodes, and whose object is to preserve rather than waste the oxidizable metal in the battery. I do not therefore claim any arrangement of machinery by which to remove the products of such batteries; but what I claim is the machinery, as substantially set forth, to remove from the sphere of my battery in which the zinc is unamalgamated and designed to waste, and in which the whole office of the electricity generated by it is to increase the consumption of the zinc, and thereby promote a rapid decomposition of water, and not to be conducted by wires to electrodes, as in other batteries, the oxidized water to be converted into products of commercial value by any of the known chemical processes.

In addition to the foregoing described mode of decomposing water and obtaining free hydrogen and the oxide of zinc, I have discovered that I can accomplish the same result by substituting heat for the acid, and retorts for the electro-negative metal in the battery. In decomposing water by this method, I use retorts of any known materials and construction which I deem proper to adopt. I charge these retorts with zinc or any of the ores of zinc instead of iron. These retorts I heat, and pass through them water or steam. I sometimes use two or more retorts, and charge the first with charcoal or coke, or some analogous carbonaceous matter, and pass water or steam over the heated carbon in the retort. The water or steam is converted into free hydrogen, carbonic oxide, and carbonic acid, with some aqueous vapor. By passing these mixed gases through a retort charged with zinc or its ores, the aqueous vapor is decomposed, and also the carbonic acid, one equivalent of the oxygen of the acid combining with the zinc or its ores and forming oxide of zinc, and the other portion of the acid forming carbonic oxide. I then carbonize the gas by passing it through my benzolizing vessel, and charge it with the vapor of some volatile hydrocarbon, or else which may be in some cases desirable, I pass the gas into another retort, where I combine it with decomposed oil, rosin, tar, melted pitch, or some analogous carbonaceous matter, and thus form a permanent gas.

What I claim as my invention, in this mode of decomposing water and manufacturing the oxide of zinc for commercial use, is the right to charge retorts of any known construction or materials, either entirely or in combination with charcoal or coke or any analogous carbonaceous materials, with zinc, or any of the ores of zinc, instead of iron or coal, as heretofore used in manufacturing gas. The particular benefit resulting from this invention consists in the fact that while I more perfectly decompose the water and with a less degree of heat, the oxide of zinc becomes a valuable product.

I am aware that zinc is oxidized by heating it in furnaces; but in that case the oxygen is derived from the air, while in the mode above set forth it is heated in an air-tight retort, and the oxygen is derived from the water. Thus I can generate any quantities of gas by means of zinc or its ores, and at a nominal expense, while nearly the whole residuum is converted into the oxide of zinc, which is valuable as a commercial product; also, by using retorts of clay or plumbago mixed with fire-clay, instead of iron, they will last much longer, inasmuch as the oxygen of the water all combines with the zinc or its ores, and the retorts are not oxidized and destroyed as rapidly as they would be were they made of iron and charged with iron scraps or filings. My invention is limited, however, to the right of charging any retorts with zinc or its ores, either alone or mixed or combined in any manner with charcoal, coke, or any analogous carbonaceous materials, for the double purpose of decomposing water for light and heat and for manufacturing the oxide of zinc.

My next improvement consists in a new and useful mode of increasing the heating-power of hydrogen or other gas.

The nature of my said improvement consists in passing the gas, previous to its combustion, through or in contact with charcoal or charred matter; and, for the purpose of better accomplishing the intended effect, the charcoal or charred matter may be in a pulverized or powdered state. The gas abstracts from it a property by which, when it is inflamed, its heating properties are greatly increased. I increase the heating-powers of hydrogen or other gas and atmospheric air, either separate or combined, by passing them, or either of them, in a pipe or pipes, under pressure, into a vessel containing charcoal, or its equivalent, in a pulverized state or otherwise, and conveying the gas or gases from thence in a pipe, to be burned at a jet, thereby adding greatly to the heating properties of hydrogen or other gas or air, or both combined, for any purpose to which heat is applied.

What I claim as my improvement or discovery is the employment of charcoal or an analogous carbonaceous matter to improve the heating properties of hydrogen or other gas or combination of gases, substantially in the manner as hereinbefore specified.

Another part of my invention consists in the mechanical construction and arrangement of a vessel in which I can impregnate or imbue atmospheric air or gas of any kind with the vapor of any volatile hydrocarbon—as alliole, benzole, pyroxylic spirit, acetone, or other analogous burning-fluids, which are so volatile, either alone or mixed together or with water or alcohol, as to carbonize common air or gas at the common temperature and at a distance from the vessel or reservoir aforesaid. I am aware that both air and gas have been passed through and over these fluids and burned. I therefore do not claim the principle as new with me. I am also aware that the reservoir containing these volatile hydrocarbons have been so constructed as to have only one compartment where the vapor is generated and the air or gas is mixed. The consequence of this is that the process of evaporation very soon abstracts so much caloric from the fluid that the temperature falls and the vapor ceases to rise in sufficient quantities to carbonize the air or gas, and the light consequently decreases very much in brilliancy. The chief remedy in such cases is to heat the reservoir, and thus raise the temperature of the fluid and keep up the evaporation; but this is attended with care and trouble. The pecularity of my invention is in the construction of a vessel or reservoir of such a character that the air or gas is brought into contact with such extended surfaces of the fluid or fluids aforesaid as to be perfectly carbonized without the application of heat or other artificial contrivances. The following is a more particular description of this benzolizing-vessel: I construct a perfectly tight tin box, or a box of some other suitable material, say, two feet long, (more or less,) one foot and a half in height, (more or less,) and one foot wide, (more or less.) Within this box there are four chambers or compartments, (more or less,) arranged in the following manner: One inch and a half above the bottom of the box there is inserted a false bottom soldered tight to the sides of the box and perforated with holes—say one-fourth of an inch in diameter and not far apart—so that the fluid can readily flow through this false bottom and the vapor as readily ascend. Upon this perforated bottom or shell I arrange a layer of sponges or cotton wicking, or some analogous porous substance, three inches in depth. Over this sponge, or its equivalent, I insert another tin or analogous shelf, soldering it tight to the sides of the box, except one end, which is turned up, say, three inches, forming a pan three inches deep, (more or less,) and leaving a space of about one inch between the end of the box and the end of this pan, for the air or gas to ascend from the chamber below, and also for the fluid supplied from above to flow into the compartment below. Into this pan or basin is inserted a perforated tin or other shelf, and made tight to the sides of the same, one inch and a half from its bottom. Upon this shelf is arranged another layer of sponges or cotton, or other analogous matter, as in the division below, filling a space of some three inches. Over this layer of porous materials another pan or basin is set in and soldered tight to the sides of the box, except that the alternate end of this basin is turned up three inches, (more or less,) and one inch from the end of the box. Into this pan is inserted a shelf, as in the basin below, perforated with holes and set one inch and a half (more or less) from its bottom. This shelf is covered with a similar layer of sponges or cotton, or some equivalent material. Over this layer is set another basin, similar to those below, except that the opening at the end of this basin is at the other end of the box from that which is next beneath it. Into this basin or pan is fixed another shelf, perforated as the others, and similarly arranged and covered with the same porous materials. In this manner four chambers or compartments are arranged within the box. These chambers may be multiplied in number to any extent in proportion to the amount of air or gas required to be benzolized. On the top of this box, and at one end, I insert a pipe extending down into the first chamber to within a quarter of an inch of its bottom. This pipe reaches some four inches above the top of the box, and is terminated with a funnel. Through this pipe and between the funnel and the top of the box is fixed a stop-cock. The fluid is poured into this funnel and runs down into the first basin and fills it, saturating the sponges resting on the shelf within it. Then it flows over the end of the basin and descends into the second, filling that as the first, and then flowing over and descending into the third and fourth, filling each to the height of three inches, (more or less;) but as the fluid cannot flow out of the bottom pan into another reservoir below, I insert into the box a draw-off cock three inches (more or less) from its bottom. By opening this cock and pouring the fluid into the funnel above, when the basins are all filled and the bottom compartment is also filled to the same depth, the fluid will run out of the draw-off cock. This cock is then shut, and also the one below the funnel. An opening is made through the top of the box, and in that end of it in which the first basin below is soldered tight to the box. This opening is for the escape of the benzolized air or gas. Another inlet-opening is made in the end of the box near the top of the lower chamber. Through this opening the air or gas enters, passing over, around, and through the saturated sponges, cotton, or other equivalent material, until it traverses to the other end of the same, where it rises into the second compartment and traverses back in the same way over, around, and through the moistened porous material to the other end of that chamber, where it ascends into the third division and continues in like manner through that, and then rises into the fourth and passes through that to the exit-pipe, through which it passes on to a gas or air holder, or to the burners to be ignited. This is a very important mechanical arrangement. The benefits of it are chiefly these, without which it is almost totally impracticable to attempt to use this light:

First. This contrivance exposes the air or gas to such a continuous surface of the benzolizing fluid or vapor as to imbue the air or gas perfectly with the vapor, without resorting to any other artificial contrivance to keep up the temperature and throw off vapor when the fluid becomes cooled by evaporation.

Secondly. This arrangement prevents the jumping of the lights, which always results from unequal and unsteady pressure. If the air or gas is made to bubble through the fluid, it passes through in pulsations, and, being delivered in unequal quantities, the lights tremble and jump, unless burning under very great pressure; but in this arrangement the air or gas passes through chambers of vapor which do not obstruct the free passage of the same to the burners.

Thirdly. By this mechanical contrivance I avoid the necessity of the immense pressure necessary to drive large currents air or gas through any of the volatile hydrocarbons, giving it a sufficient dip to imbue it with moisture in sufficient quantities to enable it to burn with a clear, white light, no extra pressure being necessary to pass the air or gas through these chambers of vapor.

What I claim as my invention is the mechanical arrangement of a series of chambers and basins and perforated shelves, with the funnel and draw-off cock, in combination with the sponges or cotton, or other analogous porous or absorbent material, as substantially set forth, for the purpose of benzolizing common air and other non-luminous gases with any of those hydrocarbons which are sufficiently volatile to enable atmospheric air or any of the non-luminous gases to burn with a clear, white light when passed through these chambers filled with their vapors at the common temperature and at a distance from the reservoir aforesaid. I do not claim this arrangement for the purpose of naphthalizing gases and improving their luminous character by means of those hydrocarbons which are not sufficiently volatile to enable the non-luminous gases to burn with a clear, white light at the common temperature and at a distance from the naphthalizing-vessel. I do not intend to confine myself to the exact construction of this vessel, as above described; but while I shall adhere to it, substantially, I also claim the right to vary it in all those points which experience may suggest, provided that I will not change the general character and design of the same.

Another particular, in the series of my inventions for the production of artificial light by means of impregnating common air with the vapor of the volatile hydrocarbons, as above set forth, consists in the construction of burners suitable for the combustion of the benzolized air. There is no gas-burner designed for the consumption of coal-gas which can burn benzolized air without some alterations. This is owing to the density of the air, and also to the fact that the air being constituted of twenty-one parts of oxygen and seventy-nine parts of nitrogen, the nitrogen, while it escapes through the burners, contributes nothing to the light, except that it becomes the beast of burden to carry up the hydrocarbonaceous vapors to the burners, where they are ignited, and supported in their combustion by the twenty-one parts of oxygen contained in one hundred parts of the air-current. What is necessary in the construction of these burners is the enlargement of the slots or orifices of the burners, and such an enlargement of the chambers of said burners as shall, without extraordinary pressure, deliver sufficient benzolized air to produce a good flame.

I do not claim the construction of a burner one part of which is movable, so that the orifices can be adjusted in size so as to produce a light, as a part of my invention; but what I claim is the construction of Argand, fish-tail, bat's wing, union-jet, and other gas-burners, where all the parts are immovable, into air-burners. I do this, for example, with Argand burners, by taking out the iron perforated ring which is set in between the two cylinders at the top, and leaving open the whole cylindrical space between the two cylinders, or by retaining said ring and perforating it with fewer and larger holes, the holes being so few and so large as to cause the jets of flame to unite and form one solid body. If the burner be of any other construction, all that is necessary is to make the orifices, if round, one-eighth of an inch in diameter, more or less. In this way fish-tail or analogous burners may be constructed, or simple caps perforated with such holes on the sides, or across the top, or in any other equivalent manner. If the burners are constructed with slots, their width must be much larger than those of gas-burners, and also the chambers or reservoirs of benzolized air just below the slots must be of such size as to deliver the air sufficiently fast, without much pressure, to fill the slots and support a good light. If this be not attended to and the pressure be slightly increased to force more air through, the light will at once go out. The burner, however, which I prefer is the Argand, prepared by leaving the space open between the two cylinders for one-eighth of an inch wide, (more or less,) from which space the benzolized air issues in a circle, and when ignited forms a solid circular flame, like the common gas-flame of an Argand burner. These burners may be so constructed purposely for this atmospheric light; or common Argand gas-burners may be taken and the small perforated iron ring at the top between the two cylinders may be removed, which will accomplish the same end. Over this burner should be placed a glass chimney about six inches high, with the lower part, which immediately surrounds the flame, swelled to nearly twice the diameter of the top. A further improvement of this burner in particular, and of all constructions of burners capable of consuming benzolized air in general, is the construction of platinum, palladium, or other analogous metallic cones, wicks, and apparatus, to be so placed over the said burners as that when they are ignited these metallic cones, wicks, or apparatus may be heated white hot, and thus produce a light suitable in cheapness and intense brilliancy for light-houses and streets, and other situations where a very powerful and dazzling light is necessary. I do not claim the principle of using these metallic arrangements for increasing the luminousness of gas; but I confine my claim to the right to make and use any construction of platinum, palladium, or other analogous metallic cones, wicks, or apparatus to be placed in such contact with a flame produced by the burning of common air imbued with the vapor of any volatile hydrocarbon as to be heated white hot, and thereby increase the intensity and brilliancy of the light. This light I design for light-houses; but I will not confine myself to its use for this purpose. The shape of these metallic constructions will vary with the shape of the flame desired to be produced, it being evident that they must all have some resemblance in shape to that of the flame, in order to be so placed as to be most advantageously heated white hot. I do not intend to confine myself to the use of these metallic arrangements in connection with any construction of burner which has been or may hereafter be used; but what I claim is the broad principle of making and using them under any and all circumstances, limiting my claim exclusively to my atmospheric light, substantially as above set forth, and restricting myself only to the use of those inoxidizable metals which are capable, when white hot, of glowing with luminous intensity. The extraordinary heat produced by this atmospheric light when the burners are arranged properly for its production is remarkably well adapted to the beneficial uses of the metallic constructions above set forth, by causing platinum and analogous metals to glow with a white heat very readily.

A very excellent arrangement for an Argand burner, prepared as above set forth, is to construct a slender cone of platinum some two inches long, one end being about three-eighths of an inch in diameter, and the other nearly or quite an inch, the small end being screwed or set into a socket fixed in the center of the burner and a little below its top, so that the other end, gradually increasing in diameter, may rise above the burner nearly as high as the flame is desired to rise, so that the flame may circle round this inverted cone and easily bring it to a white heat. Various constructions of metallic wicker-work may be substituted for the above, just in proportion to the quantity and intensity of light desired.

For the better understanding of this description a drawing, with figures and references, is hereunto appended, showing such a construction of Argand burner and platinum inverted cone, as are above set forth. The peculiarity, therefore, of this part of my claim is the right to construct and use any mechanical arrangement of platinum, or palladium, or analogous inoxidizable metals, so that such a metallic apparatus may be heated white hot by means of a flame produced by a current of common air charged with the vapor of any volatile hydrocarbon, as hereinbefore set forth, and ignited as it issues from burners, no matter what the construction of said burners may be.

Another part of my invention consists of a practical air-holder or air-supplier, which I construct in the two following ways: First, I make a flexible air-holder as follows: I construct the top or bottom of board or metal, and these I make round. Then I take a belt of canvas, or duck, or leather, or some analogous flexible substance, lined with rubber inside and outside, or not, or otherwise, if I desire, and attach it firmly to the top and bottom by means of straining the said belt around the board or metal top and bottom, and then fitting on a metallic hoop over the said belt and around the edges of the top and bottom of the said air-holder, which hoops I make fast to the top and bottom by means of screws which pass through the hoops and the edges of the belt and screw into the top and bottom, and thus make the air-holder tight. The body of the air-holder is surrounded by belts or cords sufficiently near together to prevent it from bagging out irregularly when filled with air, or when being exhausted by pressure, and also so that as it is exhausted it will pack down regularly and snugly. The bottom of the said air-holder is furnished with four iron arms screwed upon the bottom and extending out some six inches from the circumference of the bottom, and each terminated with rings or holes for the reception of stanchions, whose upper ends screw or fasten into the perforated ends of two iron slats, which cross each other at right angles above the top of the air holder, and project some six inches beyond the circumference of the top, and which slats are made fast to a support above them. The air-holder then rides at ease and with regularity up and down these stanchions. In the bottom are two orifices, one for the entrance of the air and the other for its discharge and passage on to the burners. The entrance-orifice is so constructed that a large double-acting blacksmith's bellows, fitted with a valve and a cock, can screw into it. The valve is designed to keep the air in while the bellows is being filled, and the cock is designed to keep the air in also while the bellows can be unscrewed and removed. By this means the air-holder can be readily filled when necessary. The air-holder can be exhausted by a weight placed upon the top, or by means of pulleys with falling weights attached.

I do not claim the broad principle of collecting atmospheric air in an air-holder; but what I claim is the mechanical construction of an air-holder, as substantially set forth, or in any analogous manner, with a view to the production of artificial light by passing currents of the same into or through the vapor of hydrocarbons sufficiently volatile to render atmospheric air luminous at common temperatures and at a distance from the reservoir of said fluids or vapors.

The second mode in which I construct an apparatus for supplying a constant current of air to the burners is as follows: I take a common gas-meter, open to the air, and then fix suitable gearing, wheels, and cranks, with an endless chain, and cause, by means of a falling weight, the several compartments of the meter to rotate. The air is thus drawn in by suction through the open tube, and forced out through the exit-pipe into an air-holder or directly on to the burners. This meter may be so constructed as that the small or central ends of the several compartments may fit air-tight into a rotating cylinder, which may be so constructed as to receive both the air and water from the compartments in their revolutions, and deliver the water into communication with the water in the meter, and the air into a separate chamber, from whence it may pass into an air-holder or directly to the burners. The benefit of such an air-supplier is that it takes up but little room, renders it unnecessary to have large and expensive air-holders, and can be easily adapted to private dwellings without requiring the labor and trouble of pumping or blowing air into an air-holder. In connection with this machine for furnishing air for the burners I will also use a small air-holder, if I choose, intermediate between the air-supplier and the burners, to prevent the lights from jumping and render the pressure regular and constant.

What I claim as my invention in reference to this machine is the machinery for rotating the several compartments, in order to draw in and force out the air, and also the construction of the rotating cylinder, into which the several central ends of the compartments are fitted, so as to prevent the air from running back and escaping through the inlet-tube after having once passed through the compartments of the meter.

I also claim the application of the principle of supplying air to burners in order to produce artificial light by means of such or any analogous machine.

I would also state that I do not intend to confine myself strictly to the manufacture and use of the two machines for supplying air to burners, as above described; but what I mean to claim is the right to make and use air-suppliers in the manner and form as set forth, or with such modifications as time and experience may suggest, provided such modifications are in harmony with the substantial principles of the two machines, as hereinbefore described.

In lighting cities and towns where it may be necessary to supply large currents of air, and force them under pressure in pipes to distant burners, I claim the right to fill my air-holders by means of engines, as well as bellows or analogous machinery.

HENRY W. ADAMS.

Witnesses:
W. H. BRERETON,
A. B. STOUGHTON.